(12) United States Patent
Yanagita et al.

(10) Patent No.: US 8,957,620 B2
(45) Date of Patent: Feb. 17, 2015

(54) MOTOR CONTROL APPARATUS, MOTOR CONTROL METHOD, MOTOR SYSTEM, AND COMPUTER-READABLE MEDIUM

(75) Inventors: Yoshiho Yanagita, Tokyo (JP); Kazuhiko Aoki, Tokyo (JP); Toshihiro Kurii, Tokyo (JP)

(73) Assignees: NEC Corporation, Tokyo (JP); NEC TOSHIBA Space Systems, Ltd., Tokyo (JP)

( * ) Notice: Subject to any disclaimer, the term of this patent is extended or adjusted under 35 U.S.C. 154(b) by 218 days.

(21) Appl. No.: 13/639,760

(22) PCT Filed: Apr. 20, 2011

(86) PCT No.: PCT/JP2011/002308
§ 371 (c)(1),
(2), (4) Date: Oct. 5, 2012

(87) PCT Pub. No.: WO2011/132411
PCT Pub. Date: Oct. 27, 2011

(65) Prior Publication Data
US 2013/0026966 A1    Jan. 31, 2013

(30) Foreign Application Priority Data
Apr. 22, 2010  (JP) ................................. 2010-098705

(51) Int. Cl.
*G05B 11/01*   (2006.01)

(52) U.S. Cl.
USPC ........... 318/671; 318/560; 318/561; 318/685; 318/590

(58) Field of Classification Search
USPC ............ 318/671, 560, 561, 721, 400.34, 727, 318/590, 685
See application file for complete search history.

(56) References Cited

U.S. PATENT DOCUMENTS

| 5,249,254 | A  | * | 9/1993 | Murphy et al. ................ 318/603 |
| 5,278,481 | A  | * | 1/1994 | Danbury ........................ 318/685 |
| 5,744,926 | A  | * | 4/1998 | Lai et al. ........................ 318/590 |
| 5,901,123 | A  | * | 5/1999 | Taniguchi et al. ......... 369/47.28 |
| 6,389,373 | B1 | * | 5/2002 | Ohya ............................ 702/189 |
| 6,731,575 | B2 | * | 5/2004 | Taniguchi et al. ......... 369/47.28 |
| 6,914,914 | B1 | * | 7/2005 | Flood et al. ................... 370/503 |
| 7,007,106 | B1 | * | 2/2006 | Flood et al. ................... 709/248 |
| 7,111,195 | B2 | * | 9/2006 | Berkcan et al. ................ 714/12 |
| 7,353,417 | B2 | * | 4/2008 | Desuche et al. ............... 713/400 |

(Continued)

FOREIGN PATENT DOCUMENTS

| JP | 62-290376 A | 12/1987 |
| JP | 2000-078875 A | 3/2000 |

(Continued)

*Primary Examiner* — Paul Ip
(74) *Attorney, Agent, or Firm* — Sughrue Mion, PLLC

(57) ABSTRACT

A motor control apparatus that controls the rotational angle of a motor (111) which drives a rotating body (112) includes a synchronizing means (200) for generating and outputting an interrupt signal (700) based on an external reference signal (600) input from outside and a rotating body reference signal (500) generated by the rotating body, and a controlling means (300) for computing a command value for making the rotational angle of the motor follow a target rotational angle and outputting the command value to the motor each time the interrupt signal is inputted. The synchronizing means (200) changes the output period of the interrupt signal (700) in accordance with a time difference between the external reference signal (600) and the rotating body reference signal (500).

7 Claims, 7 Drawing Sheets

(56) References Cited

U.S. PATENT DOCUMENTS

| | | | |
|---|---|---|---|
| 7,457,322 B1* | 11/2008 | Flood et al. | 370/503 |
| 7,721,001 B1* | 5/2010 | Flood et al. | 709/248 |
| 7,818,457 B1* | 10/2010 | Flood et al. | 709/248 |
| 8,212,508 B2* | 7/2012 | Paintz et al. | 318/400.34 |
| 8,212,514 B2* | 7/2012 | Campbell et al. | 318/600 |
| 2001/0040845 A1* | 11/2001 | Taniguchi et al. | 369/47.2 |
| 2002/0154586 A1* | 10/2002 | Taniguchi et al. | 369/47.28 |
| 2003/0212835 A1* | 11/2003 | Berkcan et al. | 709/400 |
| 2005/0248901 A1* | 11/2005 | Desuche et al. | 361/149 |
| 2006/0015862 A1* | 1/2006 | Odom et al. | 717/168 |
| 2009/0096397 A1* | 4/2009 | Paintz et al. | 318/400.35 |
| 2010/0123418 A1* | 5/2010 | Itoh et al. | 318/400.02 |
| 2010/0123423 A1* | 5/2010 | Campbell et al. | 318/600 |
| 2010/0239172 A1* | 9/2010 | Akiyama | 382/190 |
| 2013/0002185 A1* | 1/2013 | Hosomi et al. | 318/625 |

FOREIGN PATENT DOCUMENTS

| | | |
|---|---|---|
| JP | 2002-199766 A | 7/2002 |
| JP | 2005-351981 A | 12/2005 |
| JP | 2006-050717 A | 2/2006 |

\* cited by examiner

MOTOR CONTROL APPARATUS, MOTOR CONTROL METHOD, MOTOR SYSTEM, AND COMPUTER-READABLE MEDIUM

CROSS REFERENCE TO RELATED APPLICATIONS

This application is a National Stage of International Application No. PCT/JP2011/002308 filed Apr. 20, 2011, claiming priority based on Japanese Patent Application No. 2010-098705, filed Apr. 22, 2010, the contents of all of which are incorporated herein by reference in their entirety.

TECHNICAL FIELD

The present invention relates to a motor control apparatus, a motor control method, a motor system and a computer-readable medium and, particularly, to a motor control apparatus, a motor control method, a motor system and a computer-readable medium for controlling a 3-phase motor by vector control with synchronization between a reference signal and a reference angle of a rotating body.

BACKGROUND ART

Sensing technology includes a technique of scanning a given area of an object using an observation sensor including a motor system. A motor of the motor system is controlled to rotate at a target rotational angular speed, maintaining synchronization between a reference signal and a reference angle of a rotating body.

FIG. 8 shows a conceptual diagram showing the operation of scanning a given area of an object using an observation sensor including a rotating body (load) attached to a motor. In the motor system of FIG. 8, a rotating body 202 attached to a motor 203 rotates at a constant target rotational angular speed (steady target rotational angular speed) in the direction indicated by the dotted arrow in FIG. 8. Generally, the direction in which the rotating body 202 faces, that is, the orientation angle of the rotating body 202 (the solid arrow and the dashed arrow in FIG. 8) is specified by the angle from a reference direction. A reference angle is an angle (the solid arrow in FIG. 8) when the rotating body 202 is oriented to a specific position 303 of a scan area 302 of an object 301.

FIG. 9 shows one system to control a motor that drives a rotating body to rotate at a target rotational angular speed. FIG. 9 is a block diagram showing a structure of a motor system with a constant sampling period. In FIG. 9, the motor system includes a scanning unit 201, a clock generation unit 205, an interrupt signal generation unit 207, and a control unit 209.

The scanning unit 201 includes a rotating body 202 that rotates at a steady target rotational angular speed and a motor 203 that drives the rotating body 202. The scanning unit 201 detects a rotational angle 204 of the motor 203 and outputs it to the control unit 209. Further, the scanning unit 201 controls the motor 203 so that the rotating body 202 rotates at a target rotational angular speed by a command value 211 output from the control unit 209.

The clock generation unit 205 generates a clock 206 that serves as the basis for system operation and outputs it to the interrupt signal generation unit 207.

The interrupt signal generation unit 207 counts the clock 206 input from the clock generation unit 205 up to a specified number and thereby generates an interrupt signal 208, and then outputs it to the control unit 209.

To the control unit 209, a target rotational angle 210 for controlling the motor 203 of the scanning unit 201 is input from the outside, and the rotational angle 204 is input from the scanning unit 201. Then, each time the interrupt signal 208 is input from the interrupt signal generation unit 207, the control unit 209 generates the command value 211 for making the rotational angle 204 follow the target rotational angle 210 and outputs it to the scanning unit 201.

In the motor system of FIG. 9, the control unit 209 generates the command value 211 and outputs it to the scanning unit 201 upon receiving the interrupt signal 208 that occurs with a constant sampling period. The motor 203 of the scanning unit 201 is controlled based on the command value 211, so that the rotating body 202 achieves a desired rotational angular speed and is oriented to a specific position of a scan area of an object.

As a technique to control the rotational angular speed of a rotating body to be synchronized with an external reference signal, Patent Literature 1 (Japanese Unexamined Patent Application Publication No. 2005-351981) discloses a technique of changing a control gain in accordance with a phase difference between an external reference signal and a reference angle. Patent Literature 2 (Japanese Unexamined Patent Application Publication No. 2006-050717) discloses a technique of generating a motor control signal based on rotational speed control and phase control in accordance with a phase difference between an external reference signal and a reference angle.

CITATION LIST

Patent Literature

[PTL 1] Japanese Unexamined Patent Application Publication No. 2005-351981
[PTL 2] Japanese Unexamined Patent Application Publication No. 2006-050717

SUMMARY OF INVENTION

Technical Problem

According to the technique of Patent literature 1, although the phase difference between the external reference signal and the reference angle can be reduced by changing the control gain, there are setting limits to the control gain and it is thus difficult to control the control gain within a minute range.

Further, according to the technique of Patent literature 2, in the motor control device that makes speed control, a rotational speed control signal for making rotation synchronization control is generated from an estimated rotational speed that is calculated from an FG signal generated with several pulses per rotation and a target rotational speed. Further, a phase control signal for making phase control is generated from a phase difference between an external reference signal and a rotating body reference signal. The rotational speed control is made at the rotational speed accuracy calculated with the number of purses of the FG signal generated per rotation; however, in the case of a signal that is generated by rotation of a rotating body, there are limits to the interval to generate the signal, and it is difficult to set the generation interval to be shorter than a certain interval.

An exemplary object of the present invention is thus to provide a motor control apparatus, a motor control method, a motor system and a computer-readable medium capable of controlling the rotational angular speed of a motor with high accuracy, that is, capable of making accurate control of the motor so as to reduce an error of the rotational angle of a rotating body from a target rotational angle, maintaining synchroniation with an external reference signal input from the outside.

Solution to Problem

To achieve the above exemplary object, a motor control apparatus according to the present invention is a motor control apparatus that controls a rotational angle of a motor which drives a rotating body, including a synchronizing means for generating and outputting an interrupt signal based on an external reference signal input from outside and a rotating body reference signal generated by a rotating body, and a controlling means for computing a command value for making a rotational angle of a motor follow a target rotational angle and outputting the command value to the motor each time the interrupt signal is input. The synchronizing means changes an output period of the interrupt signal in accordance with a time difference between the external reference signal and the rotating body reference signal.

To achieve the above exemplary object, a motor control method according to the present invention is a motor control method that controls a rotational angle of a motor which drives a rotating body, including generating and outputting an interrupt signal with a period in accordance with a time difference between an external reference signal input from outside and a rotating body reference signal generated by a rotating body, computing a command value for making a rotational angle follow a target rotational angle each time the interrupt signal is output, and controlling the rotational angle using the command value.

To achieve the above exemplary object, a motor system according to the present invention includes a scanning means, including a rotating body with a rotational angle varying according to rotation and a motor that drives the rotating body, for detecting and outputting the rotational angle and generating and outputting a rotating body reference signal according to a rotational speed of the rotating body, a synchronizing means for generating and outputting an interrupt signal with a period in accordance with a time difference between an external reference signal input from outside and the rotating body reference signal generated by the rotating body, and a controlling means for computing and outputting a command value for making the rotational angle input from the scanning means follow a target rotational angle input from outside each time the interrupt signal is input, wherein the scanning means controls the rotational angle of the motor based on the command value received from the controlling means.

To achieve the above exemplary object, a program according to the present invention is a program for controlling a rotational angle of a motor which drives a rotating body, the program causing a computer to execute a procedure of generating and outputting an interrupt signal with a period in accordance with a time difference between an external reference signal input from outside and a rotating body reference signal generated by a rotating body, computing a command value for making a rotational angle follow a target rotational angle each time the interrupt signal is output, and controlling the rotational angle using the command value.

Advantageous Effects of Invention

According to the present invention, it is possible to provide a motor control apparatus, a motor control method, a motor system and a program capable of controlling a motor so as to reduce an error of the rotational angle of a rotating body from a target rotational angle, maintaining synchroniation with an external reference signal input from the outside. It is thus possible to provide a motor control apparatus, a motor control method, a motor system and a program capable of controlling the rotational angular speed of a motor with high accuracy.

DESCRIPTION OF EMBODIMENTS

First Embodiment

Figure 1:
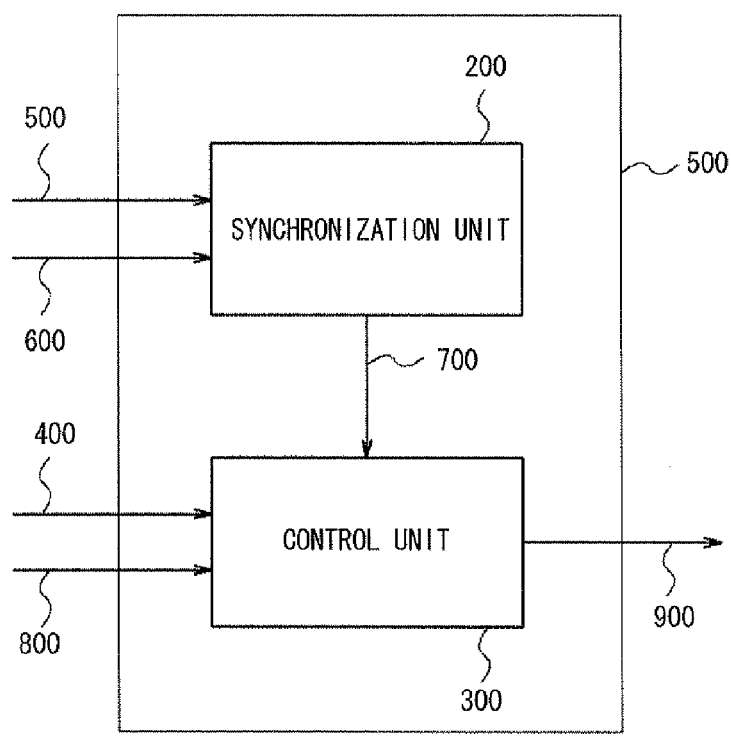
FIG. 1 is a block diagram showing an example of a structure of a motor control apparatus according to a first exemplary embodiment of the present invention.

A motor control apparatus according to a first exemplary embodiment is described hereinbelow. FIG. 1 shows an example of a block diagram of a motor control apparatus according to this exemplary embodiment. In FIG. 1, the motor control apparatus according to this exemplary embodiment includes a synchronization unit 200 and a control unit 300.

A rotating body reference signal 500 and an external reference signal 600 are input to the synchronization unit 200 from the outside. The rotating body reference signal 500 is a signal that is input each time a rotating body of a scan system, which is not shown, comes at a given orientation angle (for example, a reference angle), and it is input each time the rotating body of the scan system rotates one turn. The scan system includes a rotating body with a rotational angle varying according to rotation and a motor that drives the rotating body, and controls the motor using a command value 900 that is output from the motor control apparatus according to this exemplary embodiment. On the other hand, the external reference signal 600 is a signal that is input from the outside to achieve synchronization with an external processing device.

The synchronization unit 200 generates an interrupt signal 700 that causes control operation from the rotating body reference signal 500 that is input from the scan system and the external reference signal 600 that is input from the outside, and outputs the generated interrupt signal 700 to the control unit 300. In this exemplary embodiment, the synchronization unit 200 outputs the interrupt signal 700 with an output period that is corrected based on a time difference between the rotating body reference signal 500 and the external reference signal 600.

To the control unit 300, a rotational angle 400 and a target rotational angle 800 are input from the outside, and the interrupt signal 700 is input from the synchronization unit 200. The rotational angle 400 is an angle that is output from the above-described scan system by detecting the rotational angle 400 of the motor. On the other hand, the target rotational angle 800 is an angle that is obtained by calculating a specified rotational angle trajectory with a specified interval.

Each time the interrupt signal 700 is input from the synchronization unit 200, the control unit 300 computes the command value 900 for making the rotational angle 400 input from the scan system follow the target rotational angle 800 and outputs it. Because the output period of the interrupt signal 700 is corrected based on a time difference between the external reference signal 600 and the rotating body reference signal 500, the control unit 300 computes the command value 900 that eliminates a time difference between the external reference signal 600 and the rotating body reference signal 500 and that makes the rotational angle 400 of the motor follow the target rotational angle 800 and outputs it.

Thus, by controlling the scan system with the command value 900, the scan system is controlled so that a time difference between the external reference signal 600 and the rotating body reference signal 500 is within a specified range and the rotational angle 400 of the motor follows the target rotational angle 800. In this structure, it is possible to produce the motor control apparatus capable of controlling the rotational angle of the motor of the scan system with high accuracy.

Second Exemplary Embodiment

Figure 2:
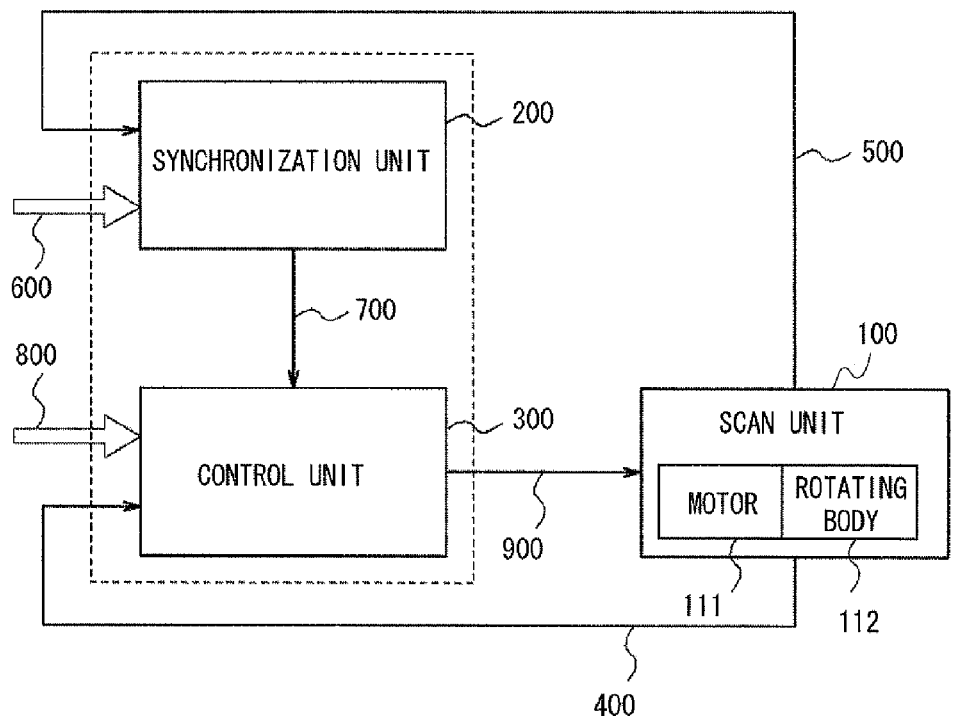
FIG. 2 is a block diagram showing an example of a structure of a motor system according to a second exemplary embodiment of the present invention.

A second exemplary embodiment is described hereinbelow. This exemplary embodiment is a motor system including a scanning unit, and a synchronization unit and a control unit (a motor control apparatus according to the first exemplary embodiment). FIG. 2 shows a block diagram of a motor system according to this exemplary embodiment.

In FIG. 2, the part enclosed in the dotted line is the motor control apparatus (FIG. 1) described in the first exemplary embodiment. In FIG. 2, a scanning unit 100 includes a motor 111 and a rotating body 112. In this exemplary embodiment, the scanning unit 100 detects the rotational angle 400 of the motor 111 and outputs it to the control unit 300 and, each time the rotating body 112 is oriented to a reference angle, generates the rotating body reference signal 500 and outputs it to the synchronization unit 200. The synchronization unit 200 generates the interrupt signal 700 based on a time difference between the external reference signal 600 that is input from the outside and the rotating body reference signal 500 that is input from the scanning unit 100, and outputs the interrupt signal 700 to the control unit 300. Then, each time the interrupt signal 700 is input, the control unit 300 computes the command value 900 for making the rotational angle 400 of the motor 111 follow the target rotational angle 800 and outputs it to the scanning unit 100.

In this exemplary embodiment, the external reference signal 600 is input from the outside to the synchronization unit 200 with a predetermined reference rotational period Tr. Further, when synchronization is present between the external reference signal 600 and the rotating body reference signal 500, the synchronization unit 200 outputs the interrupt signal 700 with a specified reference period T0. On the other hand, when there is a time difference a between the external reference signal 600 and the rotating body reference signal 500, the synchronization unit 200 outputs the interrupt signal 700 with a period Tw obtained by correcting the reference period T0 according to the time difference a. Note that, in this exemplary embodiment, the synchronization unit 200 eliminates the time difference a between the external reference signal 600 and the rotating body reference signal 500 over n number of periods. In the case of eliminating the time difference a over n number of periods, the corrected period Tw is as follows.

Period $Tw$=reference period $T0 \pm$(time difference $a/n$)

When the rotating body reference signal 500 is detected earlier than the external reference signal 600, the synchronization unit 200 outputs the interrupt signal 700 with the period Tw=reference period T0+(time difference a/n), which is longer than the reference period T0. On the other hand, when the rotating body reference signal 500 is detected later than the external reference signal 600, the synchronization unit 200 outputs the interrupt signal 700 with the period Tw=reference period T0−(time difference a/n), which is shorter than the reference period T0.

Figure 3A:
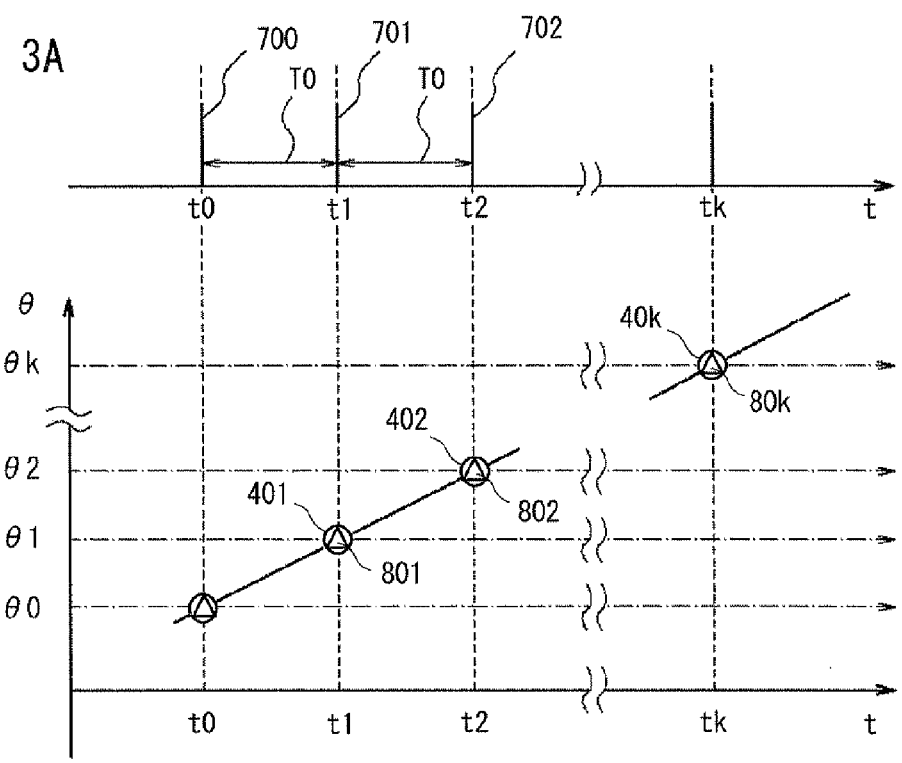
FIG. 3A is a diagram showing an example of a relationship between a target rotational angle and a rotational angle when a rotating body reference signal and an external reference signal are in synchronization according to the second exemplary embodiment of the present invention.
Figure 3B:
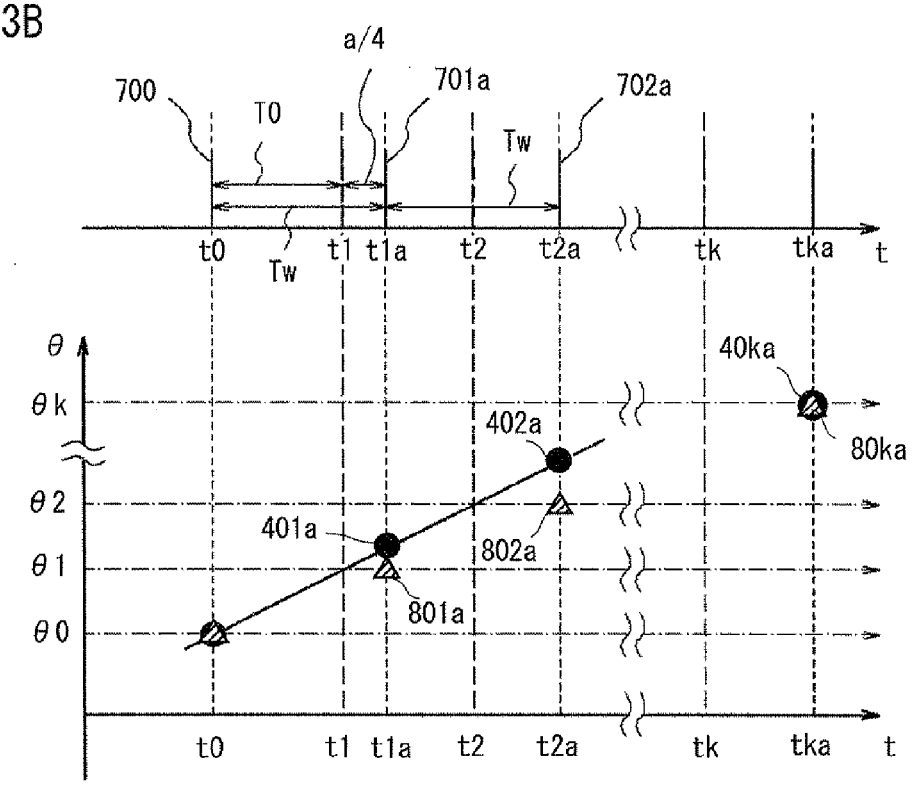
FIG. 3B is a diagram showing an example of a relationship between a target rotational angle and a rotational angle when a rotating body reference signal and an external reference signal are out of synchronization according to the second exemplary embodiment of the present invention.

Next, the variations with time of the target rotational angle 800 and the rotational angle 400 when the interrupt signal 700 is input to the control unit 300 with the reference period T0 and the variations with time of the target rotational angle 800 and the rotational angle 400 when the interrupt signal 700 is input to the control unit 300 with the period Tw are described hereinafter. FIG. 3A shows the variations with time of the target rotational angle 800 and the rotational angle 400 when the rotating body reference signal 500 and the external reference signal 600 are synchronous with each other in an exaggerated manner. FIG. 3B shows the variations with time of the target rotational angle 800 and the rotational angle 400 when the rotating body reference signal 500 is ahead of the external reference signal 600 in an exaggerated manner.

In FIGS. 3A and 3B, the circle marks indicate rotational angles 401, 401a, . . . , that are input from the scanning unit 100, and the triangle marks indicate target rotational angles 801, 801a, . . . . The target rotational angles 801, 801a, . . . in this exemplary embodiment are represented as angles (θ0, θ1, θ2, . . . ) obtained by calculating a target angle trajectory when the rotating body 112 of the scanning unit 100 rotates at a specified rotational angular speed with the interval of the above-described reference period T0.

As shown in FIG. 3A, when the rotating body reference signal 500 and the external reference signal 600 are in synchronization at time t0, an interrupt signal 701 subsequent to the interrupt signal 700 at time t0 is input to the control unit 300 at time t1 after the reference period T0. At time t1, a rotational angle 401 (white circle) is input from the scanning unit 100 and a target rotational angle 801 (white triangle) is input from the outside to the control unit 300. Because the scanning unit 100 is controlled to follow the target rotational angle 801 with the reference period T0, the rotational angle 401 and the target rotational angle 801 coincide with each other with specified accuracy. The control unit 300 computes the command value 900 that makes the rotational angle 401 follow the target rotational angle 801 and outputs it to the scanning unit 100, and consequently, at time t2 when the reference period T0 has elapsed from time t1, a rotational angle 402 and a target rotational angle 802 coincide with each other with specified accuracy.

On the other hand, in FIG. 3B, when the rotating body reference signal 500 is detected earlier than the external reference signal 600 at time t0, the interrupt signal 700 is the period Tw=(reference period T0+time difference a/n). The case where a time difference between the rotating body reference signal 500 and the external reference signal 600 is "time difference a" and the time difference a is eliminated over four periods (n=4) is described hereinbelow. In the case of eliminating the time difference a over four periods, the period is Tw=(reference period T0+time difference a/4). Specifically, the synchronization unit 200 outputs the interrupt signal 700 that delays control operation by the time (a/4). Thus, an interrupt signal 701a subsequent to the interrupt signal 700 at time t0 is input to the control unit 300 at time t1a, which is after the time (a/4) from time t1 when the reference period T0 has elapsed. At time t1a, a rotational angle 401a (black circle) is input from the scanning unit 100 and a target rotational angle 801a (=θ1) (shaded triangle) is input from the outside to the control unit 300. Because the scanning unit 100 is controlled to follow the target rotational angle 801a with the reference period T0, the rotational angle 401a at time t1a is ahead of the target rotational angle 801a by the time (a/4). Then, the control unit 300 computes the command value 900 that makes the rotational angle 401a follow the target rotational angle 801a. Then, the control unit 300 computes the command value 900 that makes the rotational angle 401a follow the target rotational angle 801a.

Further, at the time when the period Tw=T0+(a/4) has elapsed from the input of the interrupt signal 701a, an interrupt signal 702a is input to the control unit 300, and the control unit 300 computes the command value 900 that makes a rotational angle 402a follow a target rotational angle 802a. The synchronization unit 200 outputs the interrupt signal 700 that delays control operation by the time (a/4) four times, and thereby the time difference a between the rotating body reference signal 500 and the external reference signal 600 is eliminated. In the fifth period and later, the interval of inputting the interrupt signal 700 changes from the period Tw back to the reference period T0, and consequently, a target rotational angle 80ka and a rotational angle 40ka coincide with each other with specified accuracy at time tk when a given time has elapsed. Then, when the next rotating body reference signal 500 is input to the synchronization unit 200 (when the rotating body 112 rotates one turn), synchronization is maintained between the rotating body reference signal 500 and the external reference signal 600.

Although the time difference a is eliminated over four periods in this exemplary embodiment, it is not limited thereto. The control unit 300 may compute and output the command value 900 that eliminates the time difference a over two periods, or the time difference a may be eliminated gradually over a long time, ten periods or more.

Figure 4A:
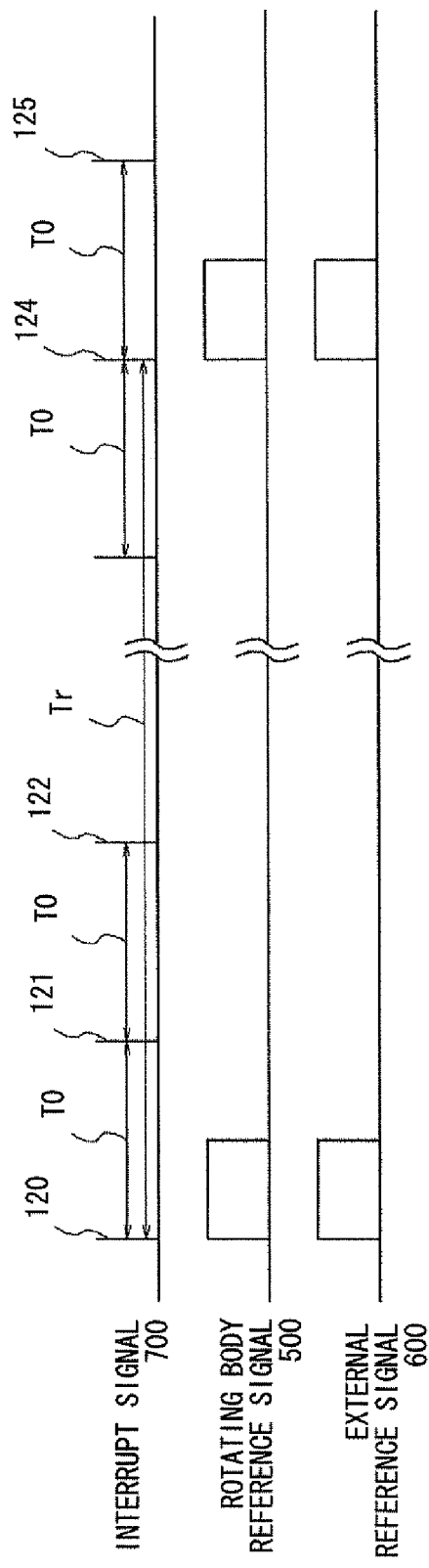
FIG. 4A is a diagram showing variation with time of an interrupt signal, a rotating body reference signal and an external reference signal when the rotating body reference signal and the external reference signal are in synchronization according to the second exemplary embodiment of the present invention.
Figure 4B:
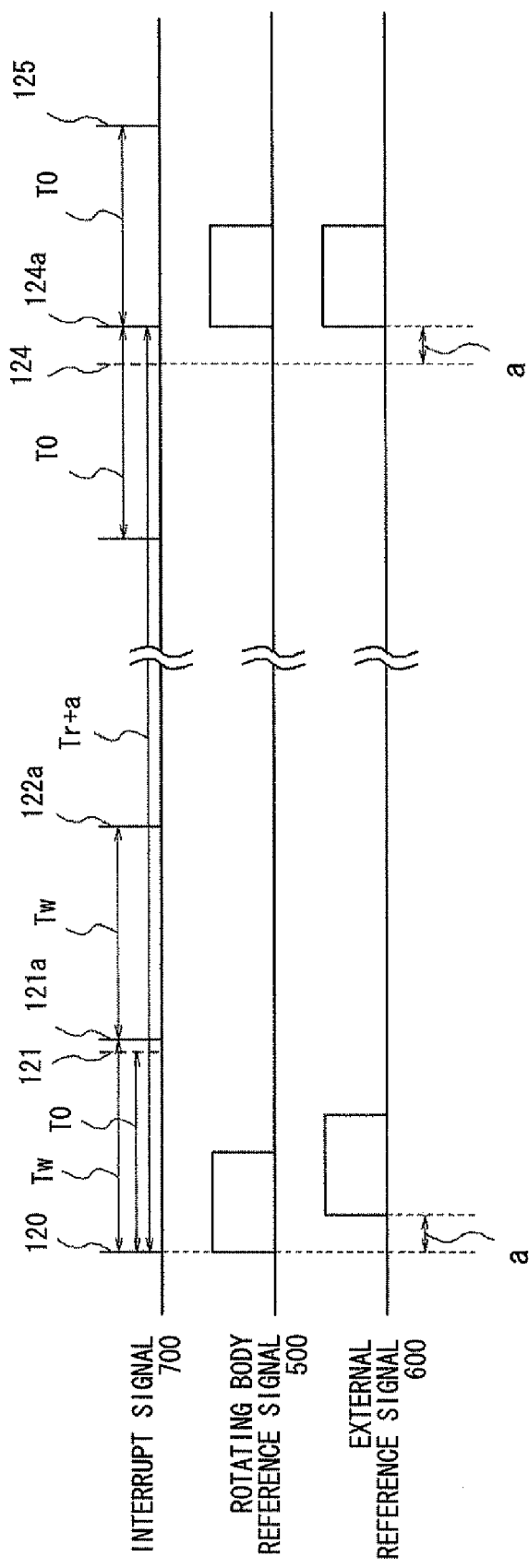
FIG. 4B is a diagram showing variation with time of an interrupt signal, a rotating body reference signal and an external reference signal when the rotating body reference signal and the external reference signal are out of synchronization according to the second exemplary embodiment of the present invention.

The variations with time of the interrupt signal 700, the rotating body reference signal 500 and the external reference signal 600 in the case of gradually eliminating the time difference a over a long period of time are described hereinbelow. FIG. 4A shows the variations with time of the interrupt signal 700, the rotating body reference signal 500 and the external reference signal 600 when the rotating body reference signal 500 and the external reference signal 600 are synchronous with each other. FIG. 4B shows the variations with time of the interrupt signal 700, the rotating body reference signal 500 and the external reference signal 600 after the rotating body reference signal 500 is detected at time 120, earlier than the external reference signal 600 by the time difference a.

In FIGS. 4A and 4B, it is High level when the interrupt signal 700 is input. Further, the rotating body reference signal 500 becomes High level each time the rotating body 112 is oriented at a specified angle, that is, the rotating body 112 rotates one turn. Note that the interrupt signal 700, the rotating body reference signal 500 and the external reference signal 600 are not necessarily asserted High level, and they may be asserted Low level, for example.

In FIG. 4A, when the rotating body reference signal 500 and the external reference signal 600 are in synchronization, the interrupt signal 700 occurs with the specified reference period T0. The scanning unit 100 is controlled by the command value 900 that is generated based on the reference period T0, and thereby synchronization between the rotating body reference signal 500 and the external reference signal 600 is maintained. In other words, the rotating body reference signal 500 and the external reference signal 600 coincide with each other with specified accuracy at time 120, and at time 124 when the reference rotational period Tr has elapsed from time 120.

On the other hand, in FIG. 4B, when the rotating body reference signal 500 is detected earlier than the external reference signal 600 by the time difference a, the interrupt signal 700 after time 120 is input to the control unit 300 not at time 121 but at time 121a after the period Tw for adjusting the time difference a over desired periods. The control unit 300 computes the command value 900 in accordance with the period Tw, and consequently the scanning unit 100 is controlled so that the time difference a between the rotating body reference signal 500 and the external reference signal 600 becomes smaller. Then, when the total of time differences between the reference period T0 and the period Tw coincides with the time difference a, the output period of the interrupt signal 700 is changed from the period Tw back to the reference period T0.

In FIG. 4B, the rotating body reference signal 500 subsequent to the rotating body reference signal 500 that has been output at time 120 is output at time 124a, which is later by the time difference a than time 124 at which the signal is output in the case where control is made only on the reference period T0. Thus, at time 124a, the rotating body reference signal 500 and the external reference signal 600 coincide with each other with specified accuracy.

As described above, in the case where the total of time differences between the reference period T0 and the period Tw is eliminated until it coincides with the time difference a between the rotating body reference signal 500 and the external reference signal 600 over a plurality of periods within a specified length of time, it is possible to avoid an abrupt change in the rotational angular speed of the rotating body 112 of the scanning unit 100.

Third Exemplary Embodiment

Figure 5:
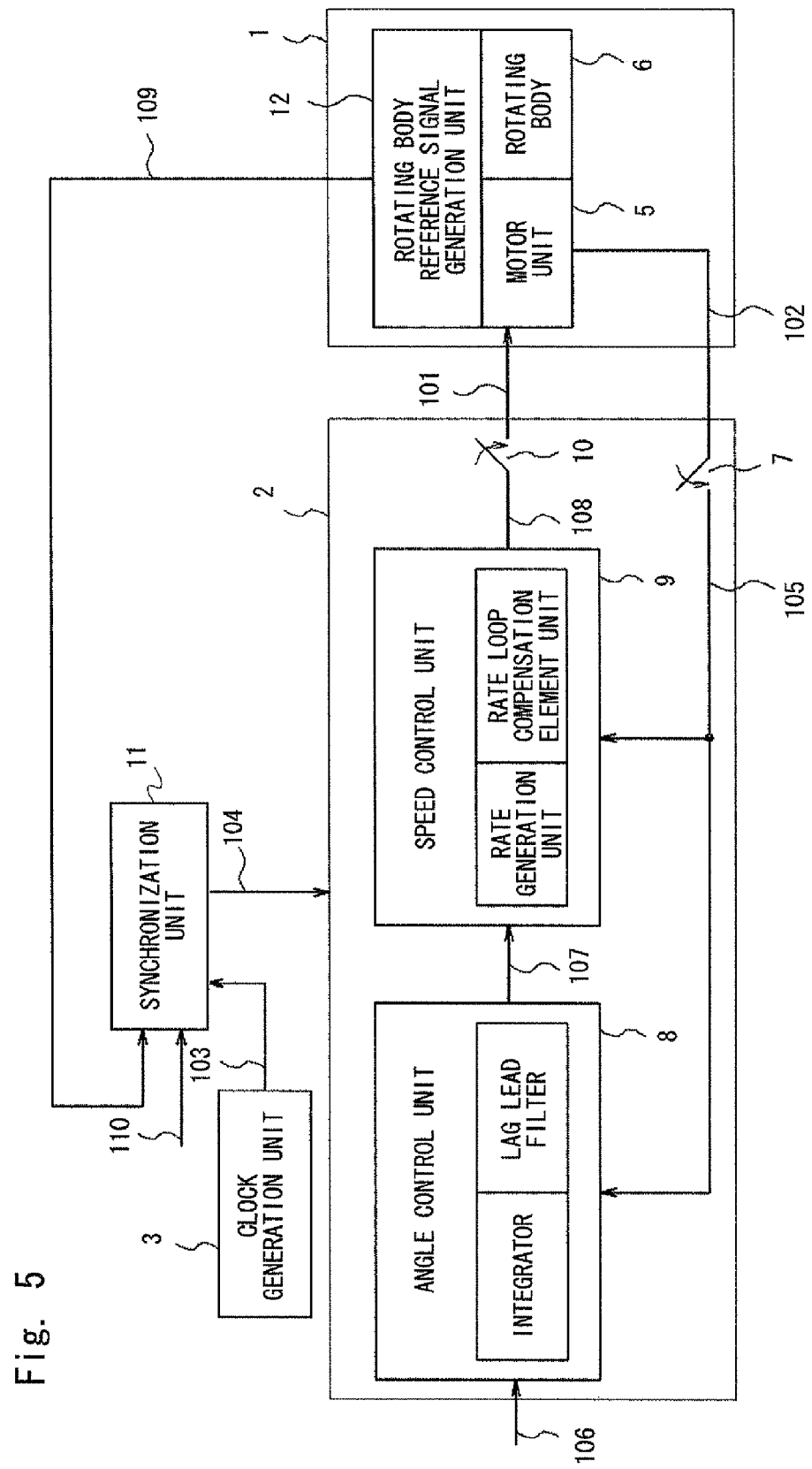
FIG. 5 is a block diagram showing an example of a structure of a 3-phase motor system according to a third exemplary embodiment of the present invention.

A third exemplary embodiment is described hereinafter. FIG. 5 is a block diagram showing a structure of a 3-phase motor system according to the third exemplary embodiment.

In FIG. 5, the 3-phase motor system according to this exemplary embodiment includes a scanning unit 1, a digital control unit 2, a clock generation unit 3, and a synchronization unit 11.

The scanning unit 1 includes a motor unit 5, a rotating body 6, and a rotating body reference signal generation unit 12. The motor unit 5 includes a 3-phase motor, an angle detector and a driver, through not shown. The rotating body 6 such as observation equipment is attached to the 3-phase motor of the motor unit 5. The 3-phase motor operates by receiving a 3-phase power from the driver through a 3-phase power line. The driver supplies a 3-phase power to the 3-phase motor through the 3-phase power line. The rotating body reference signal generation unit 12 generates a rotating body reference signal 109 based on the rotation of the 3-phase motor. In this exemplary embodiment, the rotating body reference signal generation unit 12 generates one pulse as the rotating body reference signal 109 each time the 3-phase motor rotates one turn.

Then, the scanning unit 1 outputs a rotational angle 102 of the 3-phase motor that is detected by the angle detector to the digital control unit 2 and further outputs the rotating body reference signal 109 that is generated by the rotating body reference signal generation unit 12 to the synchronization unit 11. Further, the scanning unit 1 controls the driver of the motor unit 5 based on a 3-phase command value 101 that is input from the digital control unit 2. In this exemplary embodiment, the driver performs current control of the 3-phase power line so that the voltages of the respective phases of the 3-phase power line (u-phase voltage Vu, v-phase voltage Vv and w-phase voltage Vw) are maintained at the values Vu*, Vv* and Vw* of the 3-phase command value even under the effect of a counter electromotive force of the 3-phase motor. The current control of the 3-phase power line is made by PWM (Pulse Width Modulation) control, for example.

As the 3-phase motor, a synchronous motor including an induction motor and a permanent magnetic motor may be used. As the angle detector, a resolver, an encoder, a magnetic sensor, a Hall device and the like may be used, for example. As the driver, a power supply and an analog circuit may be used, for example. Further, as the rotating body reference signal generation unit 12, a reflection type photo reflector attached to a rotor or a rotation axis of the 3-phase motor or the rotating body 6, a magnetic sensor, an encoder or a Hall device attached to the 3-phase motor may be used, for example.

The digital control unit 2 includes an A/D conversion unit 7, an angle control unit 8, a speed control unit 9, and a D/A conversion unit 10. Each time an interrupt signal 104 is input from the synchronization unit 11, the digital control unit 2 computes the 3-phase command value 101 for making the rotational angle 102 input from the scanning unit 1 follow a target rotational angle 106 input from the outside, and outputs the 3-phase command value 101 to the scanning unit 1.

Each time the interrupt signal 104 is input from the synchronization unit 11, the A/D conversion unit 7 samples the rotational angle 102 of the analog signal input from the scanning unit 1 to generate a rotational angle digital value 105, which is a digital signal, and outputs it to the angle control unit 8 and the speed control unit 9.

The angle control unit 8 is composed of an integrator and a lag lead filter, for example. The angle control unit 8 generates a speed command value 107 based on the target rotational angle 106 input from the outside and the rotational angle digital value 105, and outputs the generated speed command value 107 to the speed control unit 9. The target rotational angle 106 is obtained by calculating a target angle trajectory that varies at a certain rotational angular speed with the interval of the reference period T0, which is a reference value of the sampling period. Note that it is preferred to perform the disturbance compensation of a frequency domain with a loop bandwidth or less using the integrator and enhance the stability of a control system using the lag lead filter.

The speed control unit 9 is composed of a rate generation unit and a rate loop compensation element unit, for example. The rate generation unit estimates the rotational speed of the 3-phase motor using the rotational angle digital value 105 input from the A/D conversion unit 7. As the rate generation unit, a high-pass filter (low-frequency derivative) may be used. The rate loop compensation element unit generates a 3-phase command digital value 108 for making the rotational angle 102 follow the target rotational angle 106 from the speed command value 107 input from the angle control unit 8 and the rotational speed of the motor estimated by the rate generation unit, and outputs the generated 3-phase command digital value 108 to the D/A conversion unit 10. As the rate loop compensation element unit, a lag lead filter may be used. In the case of using the lag lead filter, the disturbance compensation of a low frequency domain can be made.

The D/A conversion unit 10 converts the 3-phase command digital value 108 input from the speed control unit 9 into analog and outputs the analog value as the 3-phase command value 101 to the scanning unit 1, each time the interrupt signal 104 is input from the synchronization unit 11.

The clock generation unit 3 generates a clock 103 to serve as the basis for system operation and outputs it to the synchronization unit 11.

The synchronization unit 11 generates the interrupt signal 104 from an external reference signal 110 input from the outside and the rotating body reference signal 109 input from the scanning unit 1, and outputs the generated interrupt signal 104 to the digital control unit 2. The external reference signal 110 is input to the synchronization unit 11 with the reference rotational period Tr, maintaining synchronization with the external device.

Figure 6:
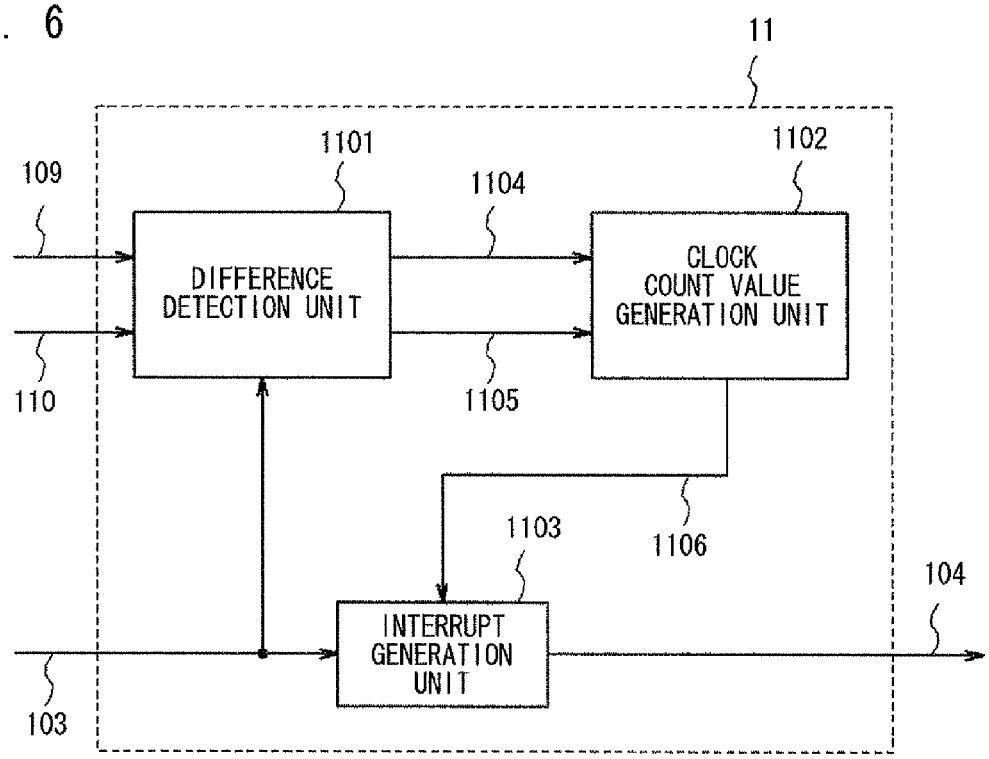
FIG. 6 is a block diagram showing an example of a structure of a synchronization unit 11 according to the third exemplary embodiment of the present invention.

The synchronization unit 11 according to the exemplary embodiment is described hereinafter in detail with reference to FIG. 6. FIG. 6 is an example of a block diagram of the synchronization unit 11. In FIG. 6, the synchronization unit 11 according to this exemplary embodiment includes a difference detection unit 1101, a clock count value generation unit 1102, and an interrupt generation unit 1103. The external reference signal 110 input from the outside and the rotating body reference signal 109 input from the scanning unit 1 are input to the difference detection unit 1101. Further, the clock 103 input from the clock generation unit 3 is input to the difference detection unit 1101 and the interrupt generation unit 1103.

The difference detection unit 1101 detects the edges of the rotating body reference signal 109 and the external reference signal 110 and counts a difference between the edges on the basis of the clock 103. The difference detection unit 1101 generates a polarity signal 1104 and a clock count correction value 1105 based on the count result and outputs them to the clock count value generation unit 1102. In this exemplary embodiment, when the rising edge of the rotating body reference signal 109 is earlier than the rising edge of the external reference signal 110 and when a difference between the edges is zero (when the rotating body reference signal 109 and the external reference signal 110 are in synchronization), the difference detection unit 1101 outputs "0" as the polarity signal 1104 and, when the rising edge of the rotating body reference signal 109 is later than the rising edge of the external reference signal 110, the difference detection unit 1101 outputs "1" as the polarity signal 1104. Further, the difference detection unit 1101 outputs a result of counting the detected difference between edges by the clock 103 as the clock count correction value 1105. Note that, when a difference between edges is zero, "0" is output as the clock count correction value 1105.

The clock count value generation unit 1102 holds a clock count initial value that corresponds to the reference period T0. Then, the clock count value generation unit 1102 corrects the clock count initial value using the polarity signal 1104 and the clock count correction value 1105 input from the difference detection unit 1101 and thereby generates a clock count value 1106. For example, when the polarity signal 1104 is "0", the clock count value generation unit 1102 adds the clock count correction value 1105 to the clock count initial value and thereby generates the clock count value 1106. On the other hand, when the polarity signal 1104 is "1", the clock count value generation unit 1102 subtracts the clock count correction value 1105 from the clock count initial value and thereby generates the clock count value 1106. The period of the corrected clock count value 1106 is referred to hereinafter as Tv. Note that, when the clock count correction value 1105 is "0" (when the rotating body reference signal 109 and the external reference signal 110 are in synchronization), the clock count initial value is output as it is, that is, the clock count value 1106 with the reference period T0 is output.

The interrupt generation unit 1103 generates the interrupt signal 104 from the clock 103 and the clock count value 1106, and outputs the interrupt signal 104 to the digital control unit 2. The interrupt signal 104 is generated by counting the clock 103 up to the clock count value 1106 just after the initial value setting that is made after the power is on until the motor rotation starts, for example.

Each time the interrupt signal 104 is input, the digital control unit 2 computes the 3-phase command value 101 for making the rotational angle 102 input from the scanning unit 1 follow a target rotational angle 106, and outputs the 3-phase command value 101 to the scanning unit 1.

When the rotating body reference signal 109 and the external reference signal 110 are in synchronization, the interrupt signal 104 is input to the digital control unit 2 with the reference period T0. At this time, because the scanning unit 1 is controlled to follow the target rotational angle 106 with the reference period T0, the rotational angle 102 and the target rotational angle 106 coincide with each other with specified accuracy, and synchronization between the rotating body reference signal 109 and the external reference signal 110 is maintained by control using the 3-phase command value 101.

On the other hand, when there is a difference between the edges of the rotating body reference signal 109 and the external reference signal 110, the interrupt signal 104 is input to the digital control unit 2 with a period Tv of the clock count value 1106 that is obtained by adding or subtracting the difference (the clock count correction value 1105) to or from the clock count initial value. As a result that the interrupt signal 104 is input to the digital control unit 2 with the period Tv, the digital control unit 2 computes the 3-phase command value 101 for adjusting the rotation in accordance with the difference (the clock count correction value 1105). Then, in the scanning unit 1, the rotation is adjusted in accordance with the difference, and the rotating body reference signal 109 and the external reference signal 110 coincide with each other with specified accuracy.

An important point in the above control is that the output period of the interrupt signal 104 varies according to a time difference between the rotating body reference signal 109 and the external reference signal 110. The digital control unit 2 computes the 3-phase command value 101 each time the interrupt signal 104 is input, and thereby controls the scanning unit 1 so that the rotating body reference signal 109 and the external reference signal 110 are in synchronization and the rotational angle 102 of the 3-phase motor follow the target rotational angle 106.

Further, in the above structure, it is possible to perform control to make the rotating body reference signal 109 synchronized with the external reference signal 110 and to make the rotational angle 102 follow the target rotational angle 106 independently of each other. This is significantly effective in making synchronization with an external reference signal at the same time as making motor angle control.

Note that, although the polarity 1104 and the clock count 1105 are distinguished in this exemplary embodiment, the difference detection unit 1101 may be configured to output a positive value, a negative value or zero as the clock count correction value 1105 to correct the clock count initial value, without outputting the polarity 1104.

Fourth Exemplary Embodiment

A fourth exemplary embodiment is described hereinbelow. A 3-phase motor system according to this exemplary embodiment is substantially the same as the 3-phase motor system according to the third exemplary embodiment shown in FIG. 5. This exemplary embodiment is different from the third exemplary embodiment in that it includes a synchronization unit 11B in place of the synchronization unit 11.

Figure 7:
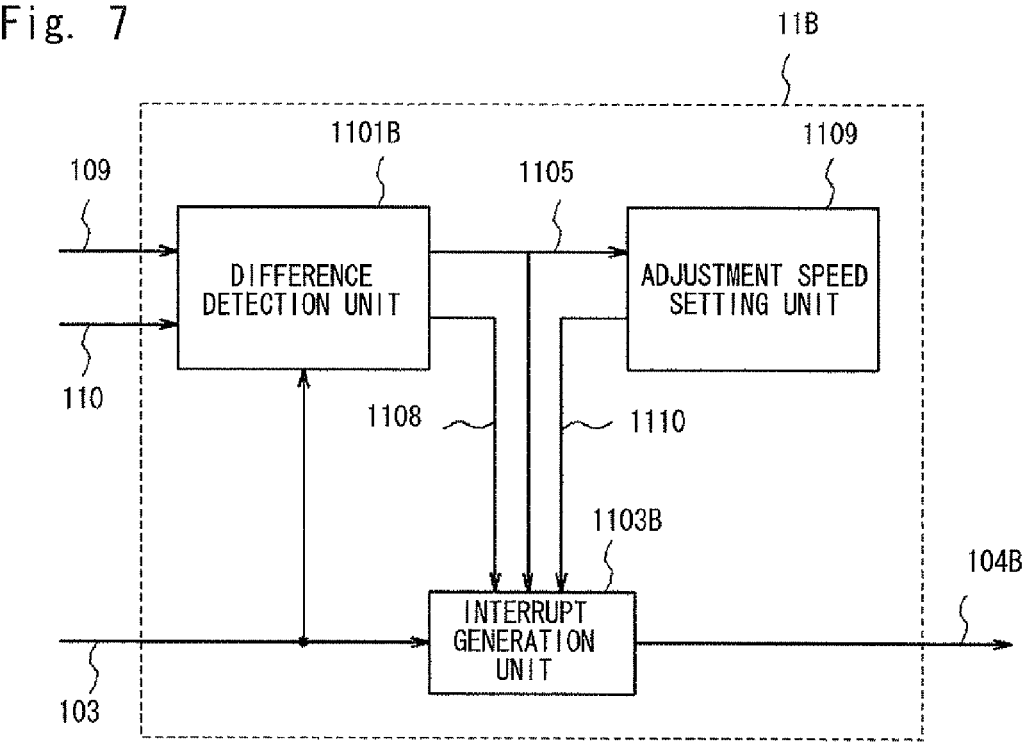
FIG. 7 is a block diagram showing an example of a structure of a synchronization unit 11B according to a fourth exemplary embodiment of the present invention.
Figure 8:
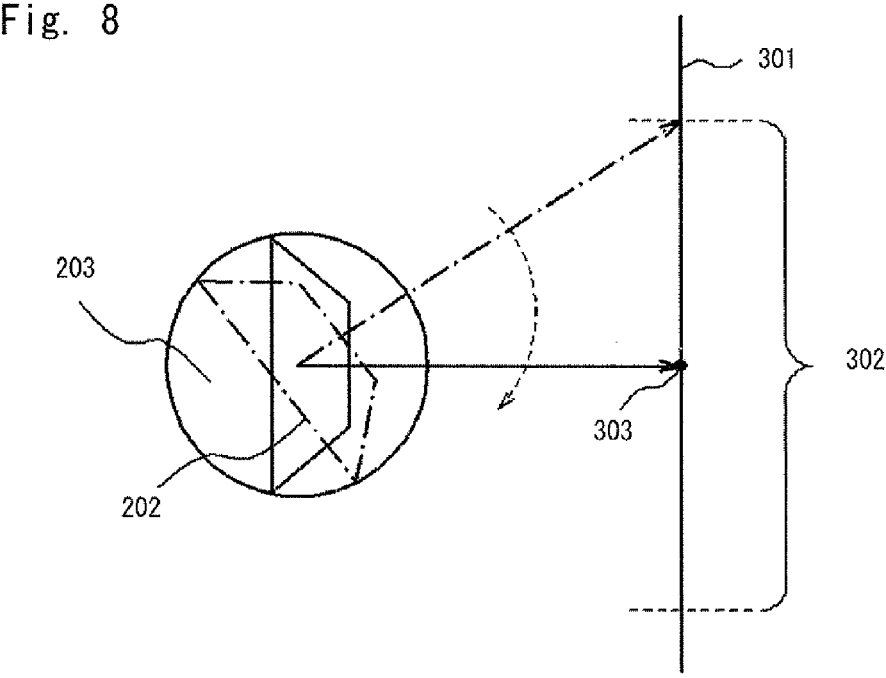
FIG. 8 is a conceptual diagram showing an example of operation to scan an object with a rotating body attached to a motor.
Figure 9:
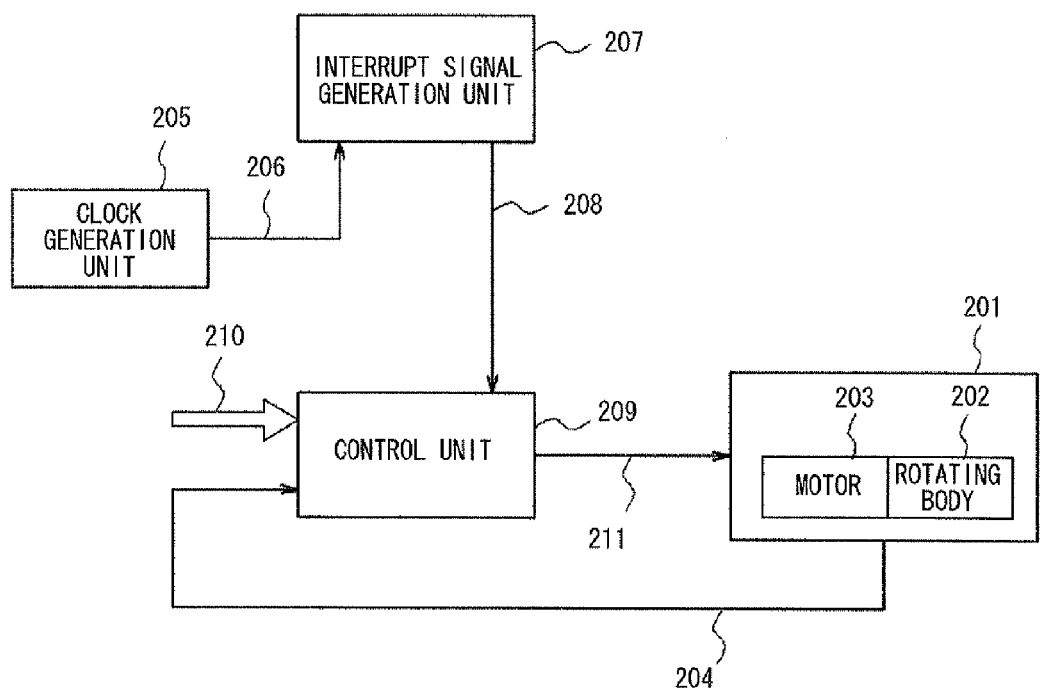
FIG. 9 is a block diagram showing a structure of a motor system according to related art.

FIG. 7 is a block diagram showing the synchronization unit 11B according to this exemplary embodiment. In FIG. 7, the synchronization unit 11B includes a difference detection unit 1101B, an adjustment speed setting unit 1109, and an interrupt generation unit 1103B.

The difference detection unit 1101B detects the edges of the rotating body reference signal 109 and the external reference signal 110 on the basis of the clock 103, and outputs a difference signal 1108 with the value of "0" when a difference between the edges is zero, outputs the difference signal 1108 with the value of "+1" when the rising edge of the rotating body reference signal 109 is detected earlier than the rising edge of the external reference signal 110, and outputs the difference signal 1108 with the value of "−1" when the rising edge of the rotating body reference signal 109 is detected later than the rising edge of the external reference signal 110, to the interrupt generation unit 1103B. Further, the difference detection unit 1101B outputs the clock count correction value 1105 described in the third exemplary embodiment to the adjustment speed setting unit 1109 and the interrupt generation unit 1103B.

The adjustment speed setting unit 1109 holds a plurality of adjustment speed information 1110 associated with the clock count correction value 1105. When the clock count correction value 1105 is input from the difference detection unit 1101B, the adjustment speed setting unit 1109 selects the adjustment speed information 1110 corresponding to the clock count correction value 1105 and outputs it to the interrupt generation unit 1103B. In this exemplary embodiment, the adjustment speed setting unit 1109 automatically selects the adjustment speed information 1110 with a small value when the clock count correction value 1105 is small, and selects the adjustment speed information 1110 with a large value when the clock count correction value 1105 is large. Note that the adjustment speed information 1110 is described later.

The interrupt generation unit 1103B generates an interrupt signal 104B from the difference signal 1108 and the clock count correction value 1105 that are input from the difference detection unit 1101B and the adjustment speed information 1110 that is input from the adjustment speed setting unit 1109, and outputs the interrupt signal 104B to the digital control unit 2. When the difference signal 1108 with the value of "0" is input, the interrupt generation unit 1103B outputs the interrupt signal 104B with the reference period T0. Further, when the difference signal 1108 with a value other than "0" is input, the interrupt generation unit 1103B outputs the interrupt signal 104B the period correction number of times m with the period Tv obtained by correcting the reference period T0. The period Tv and the period correction number of times m can be calculated as follows.

Period Tv:

When the adjustment speed information 1110 is 1, 2, ..., k, ..., n

Period $Tv$=reference period $T0$+(output interval of the clock 103×adjustment speed information 1110× difference signal 1108)

When the adjustment speed information 1110 is 1/2, 1/3, ..., 1/k, ..., 1/n

Output the interrupt signal 104$B(k-1)$ number of times with the reference period $T0$ and once with the period $Tv$=reference period $T0$+(output interval of the clock 103×difference signal 1108)

Period Correction Number of Times m:

Period correction number of times $m$=clock count correction value 1105/(output interval of the clock 103×adjustment speed information 1110)

Next, the way a difference between the external reference signal 110 and the rotating body reference signal 109 is eliminated by the different adjustment speed information 1110 is described with specific examples. Hereinafter, the case where the clock output interval of the clock generation unit 3 is 0.00001 msec (100 MHz), the reference period T0 of the interrupt signal 104B is 1.00000 msec, the reference rotational period Tr of the external reference signal 110 is 500.00000 msec, and the rotating body reference signal 109 is ahead of the external reference signal 110 by the time difference of 1.00 μsec is described as an example.

Note that, when the external reference signal 110 and the rotating body reference signal 109 are in synchronization, the difference detection unit 1101B outputs the difference signal 1108 with the value of "0" to the interrupt generation unit 1103B regardless of a difference in the adjustment speed information 1110, and the interrupt generation unit 1103B outputs the interrupt signal 104B with the reference period T0 to the digital control unit 2. The digital control unit 2 computes the 3-phase command value 101 based on the interrupt signal 104B with the reference period T0, and thereby the 3-phase motor is controlled so that the rotational angle 102 follows the target rotational angle 106 and synchronization is maintained between the rotating body reference signal 109 and the external reference signal 110.

The case where the rotating body reference signal 109 is ahead of the external reference signal 110 by the time difference (the clock count correction value 1105) of 1.00 μsec is described hereinbelow.

First, the case where "1" is set as the adjustment speed information 1110 is described. In this case, the period Tv and the period correction number of times m are as follows.

Period $Tv$ = 1.00000 msec + 0.00001 msec = 1.00001 msec

Period correction number of times m =

1.00 μsec / (0.00001 × 1)msec = 100

Specifically, the interrupt signal 104B is input from the interrupt generation unit 1103B to the digital control unit 2 the period correction number of times m=100 every Tv=1.00001 msec. When the interrupt signal 104B is input with Tv=1.00001 msec, the rotational angle 102 that is input from the scanning unit 1 to the digital control unit 2 is ahead of the target rotational angle 106 by 0.00001 msec as described in FIG. 3 of the second exemplary embodiment, and therefore the digital control unit 2 computes the 3-phase command value 101 for making the rotational angle 102 follow the target rotational angle 106 and outputs it to the scanning unit 1. Then, as a result that the interrupt signal 104B is input the period correction number of times m=100 with the period Tv=1.00001 msec, the 101th period of the interrupt signal 104B changes from the period Tv(=1.00001 msec) back to the reference period T0(=1.00000 msec). The rotating body reference signal 109 is thereby synchronized with the external reference signal 110 with specified accuracy after the reference rotational period Tr(=500.00000 msec) when the next external reference signal 110 is input since has been is detected that the rotating body reference signal 109 is ahead of the external reference signal 110 by 1.00 μsec.

Next, the case where "5" is set as the adjustment speed information 1110 is described. In this case, the period Tv and the period correction number of times m are as follows.

Period $Tv$ = 1.00000 msec + 0.00005 msec = 1.00005 msec

Period correction number of times m = 1.00 μsec / (0.00001 × 5)msec = 20

The interrupt generation unit 1103B outputs the interrupt signal 104B to the digital control unit 2 the period correction number of times m=20 with the period Tv=1.00005 msec. The digital control unit 2 outputs the 3-phase command value 101 for making the rotational angle 102 of the 3-phase motor follow the target rotational angle 106 to the scanning unit 1 twenty times. Then, the 21st period of the interrupt signal 104B changes from the period Tv(=1.00005 msec) back to the reference period T0(=1.00000 msec). The rotating body reference signal 109 is thereby synchronized with the external reference signal 110 with specified accuracy after the reference rotational period Tr(=500.00000 msec) when the next external reference signal 110 is input since has been is detected that the rotating body reference signal 109 is ahead of the external reference signal 110 by 1.00 μsec.

Further, when "1/3" is set as the adjustment speed information 1110, the output period of the interrupt signal 104B and the period correction number of times m are as follows.

Output period: after output two times with the reference period $T0$=1.00000 msec, output once with the period $Tv$=1.00000 msec+0.00001 msec=1.00001 msec Period correction number of times $m$=1.00 μsec/(0.00001×1/3)msec=300

The interrupt generation unit 1103B outputs the interrupt signal 104B two times with the reference period T0=1.00000 msec and then output it once with the period Tv=1.00000 msec+0.00001 msec=1.00001 msec, and consequently, the rotational angle 102 of the 3-phase motor delays by 0.00001 msec every three periods. After repeating this cycle hundred times, that is, after the interrupt generation unit 1103B outputs the interrupt signal 104B three hundred times to the digital control unit 2, the period of the interrupt signal 104B in the 301th cycle and later changes back to the reference period T0. The rotating body reference signal 109 is thereby synchronized with the external reference signal 110 with specified accuracy after the reference rotational period Tr(=500.00000 msec) when the next external reference signal 110 is input since has been is detected that the rotating body reference signal 109 is ahead of the external reference signal 110 by 1.00 μsec.

In this exemplary embodiment, the adjustment speed setting unit 1109B selects the adjustment speed information 1110B with a small value (for example, "1/3") when the clock count correction value 1105 is small, and selects the adjustment speed information 1110B with a large value (for example, "5") when the clock count correction value 1105 is large. Thus, the rotation of the scanning unit 1 is controlled smoothly when a time difference a between the external reference signal 110 and the rotating body reference signal 109 is small and controlled promptly when the time difference is large, so that the rotating body reference signal 109 is synchronized with the external reference signal 110 with specified accuracy.

On the other hand, an adjustment speed setting unit 1109B may hold a plurality of sets of adjustment speed information 1110B, and an appropriate set of adjustment speed information 1110B may be set according to the status or the like of an external device to which the external reference signal 600 is to be output. Specifically, when a large time difference often occurs between the external reference signal 600 and the rotating body reference signal 500, a set of the adjustment speed information 1110B with large values (for example, a set of "1" to "10") is set, and appropriate adjustment speed information 1110B is selected from the set. On the other hand, when a time difference hardly occurs, a set of the adjustment speed information 1110B with small values (for example, a set of "1/5" to "1") is set, and appropriate adjustment speed information 1110B is selected from the set. Note that the set of adjustment speed information 1110B may be automatically changed by the adjustment speed setting unit 1109B or set by a user.

An important point in the above control is that the adjustment speed of a time difference between the external reference signal 110 and the rotating body reference signal 109 can be adjusted by the output accuracy of the clock signal 103 of the clock generation unit 3. Further, an important point in the above control is that the scanning unit 1 according to this exemplary embodiment can flexibly set the adjustment speed on the basis of the output accuracy of the clock signal 103.

Other Exemplary Embodiments

The above-described motor control method may be implemented by reading a program by a computer device incorporating the control unit 300 that controls the scanning unit 100 or the digital control unit that controls the scanning unit 1. Further, each process of the motor control method is stored in a computer-readable recording medium in the form of a program, and the program is read and executed by a computer. The computer-readable recording medium may be a magnetic disk, magneto-optical disk, CD-ROM (Compact Disk-Red Only Memory), DVD-ROM (Digital Versatile Disk-Red Only Memory), semiconductor memory and the like.

Although the present invention is described as a hardware configuration in the above exemplary embodiments, the present invention is not limited thereto. The present invention may be implemented by causing a CPU (Central Processing Unit) to execute a computer program to perform a given process.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-098705, filed on Apr. 22, 2010, the disclosure of which is incorporated herein in its entirety by reference.

INDUSTRIAL APPLICABILITY

The present invention is applicable to a motor control apparatus, for example.

REFERENCE SIGNS LIST

1 SCANNING UNIT
2 DIGITAL CONTROL UNIT
3 CLOCK GENERATION UNIT
5 MOTOR UNIT
6 ROTATING BODY
7 A/D CONVERSION UNIT
8 ANGLE CONTROL UNIT
9 SPEED CONTROL UNIT
10 D/A CONVERSION UNIT
11 SYNCHRONIZATION UNIT
12 ROTATING BODY REFERENCE SIGNAL GENERATION UNIT
101 3-PHASE COMMAND VALUE
102 ROTATIONAL ANGLE
103 CLOCK
104 INTERRUPT SIGNAL
105 ROTATIONAL ANGLE DIGITAL VALUE
106 TARGET ROTATIONAL ANGLE
107 SPEED COMMAND VALUE
108 3-PHASE COMMAND DIGITAL VALUE
109 ROTATING BODY REFERENCE SIGNAL
110 EXTERNAL REFERENCE SIGNAL

111 MOTOR
112 ROTATING BODY
201 SCANNING UNIT
202 ROTATING BODY
203 MOTOR
204 ROTATIONAL ANGLE
205 CLOCK GENERATION UNIT
206 CLOCK
207 INTERRUPT SIGNAL GENERATION UNIT
208 INTERRUPT SIGNAL
209 CONTROL UNIT
210 TARGET ROTATIONAL ANGLE
211 COMMAND VALUE
100 SCANNING UNIT
200 SYNCHRONIZATION UNIT
300 CONTROL UNIT
400 ROTATIONAL ANGLE
500 ROTATING BODY REFERENCE SIGNAL
600 EXTERNAL REFERENCE SIGNAL
700 INTERRUPT SIGNAL
800 TARGET ROTATIONAL ANGLE
900 COMMAND VALUE

The invention claimed is:

1. A motor control apparatus comprising:
a synchronizing means for generating and outputting an interrupt signal based on an external reference signal input from outside and a rotating body reference signal generated by a rotating body; and
a controlling means for computing a command value for making a rotational angle of a motor follow a target rotational angle and outputting the command value to the motor each time the interrupt signal is input,
wherein the synchronizing means changes an output period of the interrupt signal in accordance with a time difference between the external reference signal and the rotating body reference signal, and
wherein the synchronizing means sets the output period to a specified reference period when the rotating body reference signal is synchronized with the external reference signal, sets the output period to a period longer than the reference period when the rotating body reference signal is detected earlier than the external reference signal, and sets the output period to a period shorter than the reference period when the rotating body reference signal is detected later than the external reference signal.

2. The motor control apparatus according to claim 1, further comprising:
a clock generating means for generating and outputting clocks to the synchronizing means,
wherein the synchronizing means counts the number of clocks corresponding to the output period and outputs the interrupt signal.

3. The motor control apparatus according to claim 1, wherein the synchronizing means changes the output period of the interrupt signal from the reference period over a plurality of periods within a specified length of time.

4. The motor control apparatus according to claim 3, wherein
the synchronizing means changes the output period in accordance with a clock output interval of the clock generating means, and
a total of differences between the output period changed over the plurality of periods and the reference period coincides with a difference between the rotating body reference signal and the external reference signal.

5. The motor control apparatus according to claim 3, wherein the synchronizing means holds a plurality of adjustment speed setting information associated with a degree of a time difference between the external reference signal and the rotating body reference signal, selects specified adjustment speed setting information in accordance with the time difference, and changes the output period based on the selected adjustment speed setting information.

6. A motor control method comprising:
generating and outputting an interrupt signal with a period in accordance with a time difference between an external reference signal input from outside and a rotating body reference signal generated by a rotating body;
computing, by a motor control apparatus, a command value for making a rotational angle follow a target rotational angle each time the interrupt signal is output; and
controlling the rotational angle using the command value,
wherein the output period is set to a specified reference period when the rotating body reference signal is synchronized with the external reference signal, the output period is set to a period longer than the reference period when the rotating body reference signal is detected earlier than the external reference signal, and the output period is set to a period shorter than the reference period when the rotating body reference signal is detected later than the external reference signal.

7. A motor system comprising:
a scanning means, including a rotating body with a rotational angle varying according to rotation and a motor that drives the rotating body, for detecting and outputting the rotational angle and generating and outputting a rotating body reference signal according to a rotational speed of the rotating body;
a synchronizing means for generating and outputting an interrupt signal with a period in accordance with a time difference between an external reference signal input from outside and the rotating body reference signal generated by the rotating body; and
a controlling means for computing and outputting a command value for making the rotational angle input from the scanning means follow a target rotational angle input from outside each time the interrupt signal is input,
wherein the scanning means controls the rotational angle of the motor based on the command value received from the controlling means, and
wherein the synchronizing means sets the output period to a specified reference period when the rotating body reference signal is synchronized with the external reference signal, sets the output period to a period longer than the reference period when the rotating body reference signal is detected earlier than the external reference signal, and sets the output period to a period shorter than the reference period when the rotating body reference signal is detected later than the external reference signal.

* * * * *